Dec. 22, 1931.    C. H. BOLLER    1,837,354
ADJUSTABLE RAIL FITTING
Filed Nov. 10, 1926

INVENTOR
Carl H. Boller
By
ATTORNEY

Patented Dec. 22, 1931

1,837,354

UNITED STATES PATENT OFFICE

CARL H. BOLLER, OF LOS ANGELES, CALIFORNIA

ADJUSTABLE RAIL FITTING

Application filed November 10, 1926. Serial No. 147,477.

As may be inferred from the above title, this invention relates to means for the support of hand rails, and the like, such as may be provided at the edges of stairways, walks, ramps, and the like; and it is a particular object of my invention to provide simple and attractive rail fittings comprising parts which may be conveniently and securely fixed in various angular relationships.

It being customary to use various somewhat crude castings for the general purposes referred to, and to bend tubular stock, at a shop or on a job, in order to produce desired angles between rails, or between rails and auxiliary members such as posts, it is an object of my invention to provide rail fittings which include a head, spherical or parti-spherical in form, this head being hollow or so apertured as to permit its engagement by clamping members adapted respectively to contact with the exterior and the interior thereof,—the exterior clamping member being spherically concave and the interior clamping member (whether simple or complex) being preferably threaded and engageable by a correspondingly threaded element, for clamping effect.

Other objects of my invention, optionally including means for preventing undesired relative rotation of parts, and/or anti-slipping means provided upon head-engaging surfaces of both or either of said clamping members, may be best appreciated from the following description of illustrative embodiments of my invention, taken in connection with the appended claims and the accompanying drawings, in which Fig. 1 may be regarded as, for the most part, a median vertical section through a rail fitting organization in which a comparatively simple embodiment of my invention is employed.

Figure 1:
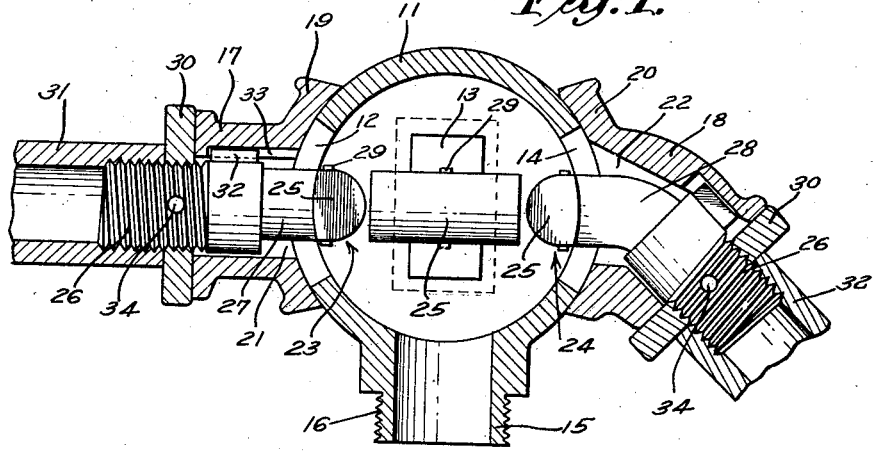

Referring to the details of that specific embodiment of my invention illustrated in Fig. 1, I show at 11 a substantially spherical hollow head, this head having a plurality of rectangular openings 12, 13 and 14, and an integral downward extension 15,—the latter serving to provide, as by means of internal or external threads 16, for the attachment of a post or other supporting member, not shown. This supporting member may be, for example, an upright extending to a floor, to a stair-tread, or the like.

Externally of the convex surface of the head 11, I show correspondingly concave or "ball-ground" external clamping members (17 and 18) as respectively provided not only with flanges (19 and 20—which may be circular in outline, whether or not eccentric with reference to the openings 12 and 14) but with central or substantially central passages (21, 22) adapted respectively to receive and to permit a limited relative movement of interior clamping members 23 and 24.

Said interior clamping members, whether straight or crooked, may comprise transverse or T heads 25 and threaded bodies 26,—these being shown as interconnected by straight or bent neck portions (27 and 28); and they may be held together, when not integral, by means such as transverse pins 29.

The threaded bodies 26 are intended to be of sufficient length to permit not only the employment thereon of clamping nuts 30 but also the engagement, by said threads, of tubular rail members 31, 32,—adapted to function incidentally as lock nuts, relatively to the mentioned clamping nuts 30.

It will be seen that whether or not the cross heads 25 are so pivoted to the necks 27 as to constitute toggle bolts, rather than rigid T bolts, the heads 25 may, in any case, be turned through about 90 degrees, after insertion (by way of the openings 12, 13, 14, within a spherical or hemi-spherical or other parti-spherical head) in such manner as to be held in any deisred angular relationship to said head, upon the tightening of the nuts 30,—assuming the external clamping members 17, 18 to have been applied and adjusted to a desired position in advance of the tightening of the nuts 30. In order to prevent relative rotation of the interior clamping members relatively to the exterior clamping members, one of these may advantageously be provided with a projection 32, adapted to interfit within a corresponding slot 33 in the other of said members; in order to increase the permissible range of angular or rotative adjustment, the flanges 19, 20 may be eccentric with reference to the longitudinal axis of the external clamping members 17, 18; and, in order to provide for holding the exterior and interior members in their intended relative positions while the nuts 30 are being started on the threaded bodies 26 of said interior members, said bodies may advantageously be provided with transverse holes 34, through which a nail or pin may be temporarily inserted,—to be withdrawn before the tightening of said nuts is completed and/or in advance of the threading of the tubular rail elements 31, 32 thereon. As a matter of fact, all external visible parts being preferably given rounded edges and a high finish, the final adjustment of the nuts 30 may advantageously be deferred until the tubular elements 31, 32 are not only applied to the bodies 26 but carefully aligned in their final angular relationship to the head 11, or its equivalent.

Figure 2:
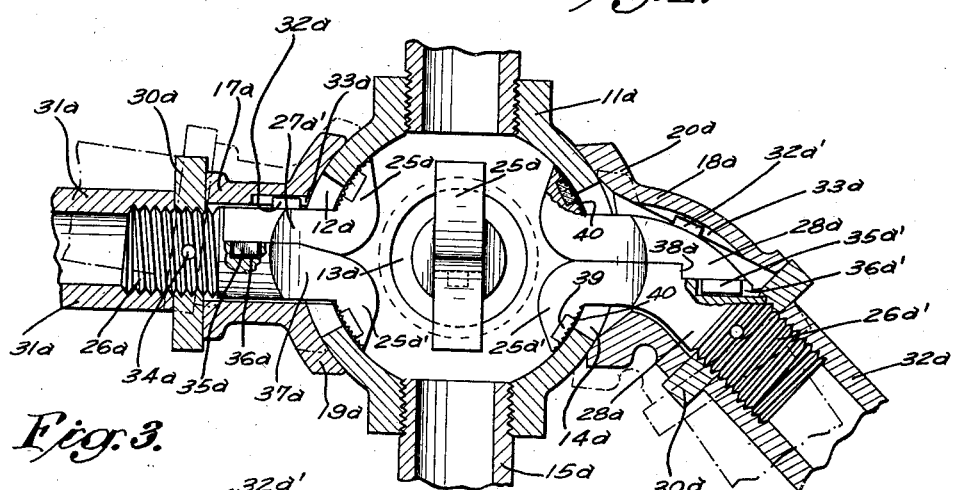
Fig. 2 is a view comparable with Fig. 1, but showing an alternative and somewhat more complicated form.
Figure 3:
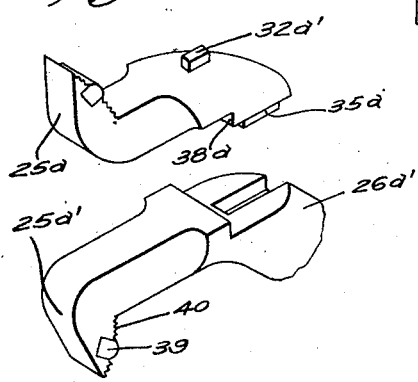
Fig. 3 is a detail view showing parts which cooperate, in that embodiment of my invention illustrated at the right in Fig. 2, to provide an interior clamping member.

Referring to the details of that specific embodiment of my invention illustrated in Fig. 2, I show the head 11a as occupying a somewhat unusual position between externally threaded tubular elements 15a and 15a', which may be assumed to be vertical posts; and I show a horizontal rail element 31a and an inclined rail element 32a as adjustably connected with said head by means comprising exterior clamping elements 17a and 18a, not fundamentally different from the corresponding members above described; but I show, in this figure and in Fig. 3, interior clamping members of a somewhat more complicated design,—these interior clamping members being formed from separable parts in a manner permitting the insertion of the same through circular openings, as provided at 12a, 13a and 14a.

For example, each interior clamping member may comprise a head formed by the co-operation of oppositely extending fingers or other parts 25a and 25a',—only the latter being shown as integrally connected with a threaded body 26a (or 26a'). That is to say, although the head sections 25a' are shown as connected by necks 27a and 28a with the bodies 26a and 26a', the neck sections 27a' and 28a' are shown as unprovided with threads,—although optionally provided not only with lugs 32a, 32a', adapted to enter slots 33a, 33a' (to prevent rotation of the interior clamping member relatively to the exterior clamping member) but also with means such as lugs 35a and 35a', adapted to enter corresponding depressions or slots 36a, 36a' in the neck sections 27a, 28a.

Means such as correspondingly inclined surfaces shown at 37a, or such as interfitting shoulders shown at 38a, may be employed to assure a retention of the mentioned parts of interior clamping members in their intended relationships,—with or without a wedging action therebetween; and, to provide for exceptional strains or other extreme conditions of use, the interior surfaces of the heads 11, 11a, or on the head-engaging surfaces of exterior or interior clamping members (as, the surfaces of fingers 25, 25a, and 25a') may be provided with anti-slippage means, such as inserts 39 and/or serrations 40,—the former being intended to undergo deformation and the latter slightly to imbed themselves relatively to the interior surface of the spherical or other heads 11 and 11a, upon tightening of the nuts 30 or 30a.

Although I use dot-and-dash lines in Fig. 2, to suggest alternative positions to which the tubular elements 31a and 32a may be swung in advance of the complete tightening of the nuts 30a, it should be understood that the use of eccentric flanges, in preference to concentric flanges, as at 19a and 20a, is entirely optional.

For the purpose of giving additional flexibility to this fitting, any number of the apertures 12a and 13a, may be made circular, as indicated at 13a in Fig. 1. Such a construction permits the clamps and consequently the rails to be set at any desired angle relative to one and another.

The general mode of use of my novel rail fittings having been fully indicated above, I call attention to the facts that any desired number of downwardly and/or laterally and/or upwardly extending rail members or supporting members may be provided in the indicated manner, and that the threaded bodies 26a are also shown as provided with apertures (34a), for the insertion of a tool to prevent rotation of the interfitting exterior and interior clamping elements, while the nuts 30a are being started thereon; and I emphasize, in conclusion, the fact that various features of my device might be independently employed, and also the fact that numerous modifications of my invention, additional to those above described, might easily be devised by workers in the arts to which this application relates, without involving the slightest departure from the spirit and scope of my invention, as the same is indicated above and in the following claims.

I claim as my invention:

1. In a rail fitting: an apertured hollow head provided with a spherically convex surface; an external clamping member having a spherically concave surface interfitting said convex surface; an internal clamping member insertable through an aperture in said head and having means engageable with the inner wall of said head for holding said member in said head; a threaded shank on said internal clamping member of smaller diameter than said aperture extending through said aperture for universally adjusting the angular relation between said head and said clamping member, said shank engaging a screw threaded means arranged to press said clamping members against the exterior and interior wall of said head; said internal clamping member being formed of a plurality of interfitting fingers, each of said fingers having a curved surface adapted to engage the inner surface of said apertured head and only one of said fingers being externally threaded for engagement by the mentioned screw threaded means.

2. In a rail fitting: an apertured hollow head provided with a spherically convex surface; an external clamping member having a spherically concave surface interfitting said convex surface; an internal clamping member insertable through an aperture in said head and having means engageable with the inner wall of said head for holding said member in said head; a threaded shank on said internal clamping member of smaller diameter than said aperture extending through said aperture for universally adjusting the angular relation between said head and said clamping member, said shank engaging a screw threaded means arranged to press said clamping members against the exterior and interior wall of said head; said internal clamping member being formed of a plurality of interfitting fingers, each of said fingers having a curved surface engaging the inner surface of said apertured head and one of the said fingers being externally threaded for engagement by the mentioned screw threaded means; said screw threaded means comprising a threaded plate mounted on said externally threaded portion of said fingers and adapted to engage said external clamping member and to be engaged by a corresponding threaded tubular rail member, also screw threadedly mounted on said threaded finger.

3. In a rail fitting: an apertured hollow head provided with a spherically convex surface; an external clamping member having a spherically concave surface interfitting said convex surface; an internal clamping member insertable through an aperture in said head and having means engageable with the inner wall of said head for holding said member in said head; a threaded shank on said internal clamping member of smaller diameter than said aperture extending through said aperture for universally adjusting the angular relation between said head and said clamping member, said shank engaging a screw threaded means arranged to press said clamping members against the exterior and interior wall of said head, said internal clamping member being formed of a plurality of interfitting fingers, each finger having a curved surface adapted to engage the inner surface of said apertured head and only one of said fingers being threaded for engagement by said screw threaded clamping means; and means on said internal clamping member engaging said external clamping member for preventing relative rotation thereof during the application of said threaded clamping means.

4. In a rail fitting: an apertured hollow head provided with a spherically convex surface; an external clamping member having a spherically concave surface interfitting said convex surface; an internal clamping member insertable through an aperture in said head and having means engageable with the inner wall of said head for holding said member in said head; a threaded shank on said internal clamping member of smaller diameter than said aperture extending through said aperture for universally adjusting the angular relation between said head and said clamping member, said shank engaging a screw threaded means arranged to press said clamping members against the exterior and interior wall of said head, said external clamping means comprising a substantially circular concave flange which overlaps, regardless of the variations in the angular adjustment thereof, the edges of the aperture in said head through which said internal clamping means extends.

5. In a rail fitting: an apertured hollow head provided with a spherically convex surface; an external clamping member having a spherically concave surface interfitting said convex surface; an internal clamping member insertable through an aperture in said head and having means engageable with the inner wall of said head for holding said member in said head; a threaded shank on said internal clamping member of smaller diameter than said aperture extending through said aperture for universally adjusting the angular relation between said head and said clamping member, said shank engaging a screw threaded means arranged to press said clamping members against the exterior and interior wall of said head, said internal clamping member being provided with anti-slippage means engaging the interior of said head.

6. In a rail fitting: an apertured hollow head provided with a spherically convex surface; an external clamping member having a spherically concave surface interfitting said convex surface; an internal clamping member insertable through an aperture in said head and having means engageable with the inner wall of said head for holding said member in said head; a threaded shank on said internal clamping member of smaller diameter than said aperture extending through said aperture for universally adjusting the angular relation between said head and said clamping member, said shank engaging a screw threaded means arranged to press said clamping members against the exterior and interior wall of said head, a lug on said internal clamping member engaging a slot in said external clamping member for preventing relative rotation between said clamping member as said members are assembled relatively to said head.

7. A rail fitting embodying: a hollow apertured head provided with a spherically convex surface; an external clamping member having a spherically concave surface interfitting with said convex surface; an interior clamping member having a shank insertable through an aperture in said head and having means on said shank engageable against the inner wall of said head for holding said member in said head; and means for pressing said clamping members, respectively, against the exterior and the interior of said head, said shank being of smaller cross-section than said aperture for universally adjusting the angular relation between said head and said clamping member.

In testimony whereof, I have hereunto set my hand at Los Angeles, California, this 30th day of October, 1926.

CARL H. BOLLER.